United States Patent
Bangel et al.

(10) Patent No.: US 7,873,944 B2
(45) Date of Patent: Jan. 18, 2011

(54) SYSTEM AND METHOD FOR MAINTAINING AND TESTING A SOFTWARE APPLICATION

(75) Inventors: Matthew J. Bangel, Poughkeepsie, NY (US); James A. Martin, Jr., Endicott, NY (US); Renee C. Mullins, Austin, TX (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 11/359,635

(22) Filed: Feb. 22, 2006

(65) Prior Publication Data

US 2007/0240116 A1 Oct. 11, 2007

(51) Int. Cl.
G06F 9/44 (2006.01)
(52) U.S. Cl. .................................. 717/124; 717/125
(58) Field of Classification Search ........ 717/124–162; 714/36–38
See application file for complete search history.

(56) References Cited

U.S. PATENT DOCUMENTS

| | | | | |
|---|---|---|---|---|
| 5,157,782 A | | 10/1992 | Tuttle et al. ................ | 395/575 |
| 5,164,912 A | | 11/1992 | Osborne et al. ............. | 364/580 |
| 5,218,605 A | | 6/1993 | Low et al. .................. | 371/16.1 |
| 5,555,410 A | * | 9/1996 | Tsuchiya .................... | 1/1 |
| 5,673,387 A | | 9/1997 | Chen et al. .............. | 395/183.14 |
| 5,694,540 A | | 12/1997 | Humelsine et al. ..... | 395/183.14 |
| 5,892,947 A | * | 4/1999 | DeLong et al. ............. | 717/100 |
| 5,907,705 A | * | 5/1999 | Carter ........................ | 717/122 |
| 6,061,643 A | | 5/2000 | Walker et al. .............. | 702/123 |
| 6,219,829 B1 | * | 4/2001 | Sivakumar et al. .......... | 717/131 |
| 6,301,701 B1 | | 10/2001 | Walker et al. ................. | 717/4 |
| 6,336,217 B1 | * | 1/2002 | D'Anjou et al. ............. | 717/121 |
| 6,415,396 B1 | | 7/2002 | Singh et al. .................... | 714/38 |
| 6,502,235 B1 | * | 12/2002 | Tosaka et al. ............... | 717/126 |
| 6,577,982 B1 | * | 6/2003 | Erb ............................ | 702/120 |
| 6,694,509 B1 | | 2/2004 | Stoval et al. ................ | 717/124 |
| 6,698,012 B1 | * | 2/2004 | Kossatchev et al. ......... | 717/126 |
| 6,698,013 B1 | * | 2/2004 | Bertero et al. .............. | 717/127 |
| 6,725,399 B1 | * | 4/2004 | Bowman ....................... | 714/38 |
| 6,810,364 B2 | | 10/2004 | Conan ........................ | 702/188 |
| 6,986,125 B2 | * | 1/2006 | Apuzzo et al. .............. | 717/124 |

(Continued)

FOREIGN PATENT DOCUMENTS

JP 511391 A 5/1993

(Continued)

OTHER PUBLICATIONS

"Introducing Rational ClearQuest" IBM, 1999.*

(Continued)

*Primary Examiner*—Anna Deng
(74) *Attorney, Agent, or Firm*—Schmeiser, Olsen & Watts; John R. Pivnichny (57) ABSTRACT

Maintaining and testing a software application by performing regression testing uses standard reusable test cases from change history records to generate actual test cases. A new test case template is created upon saving a change history entry. A subset of the actual and new test cases is determined, and new actual test cases generated and documented from the subset. The new actual test cases are released after successful verification.

21 Claims, 5 Drawing Sheets

U.S. PATENT DOCUMENTS

| | | | |
|---|---|---|---|
| 7,039,902 B2* | 5/2006 | Kuzmin et al. | 717/126 |
| 7,100,195 B1* | 8/2006 | Underwood | 726/2 |
| 7,167,870 B2* | 1/2007 | Avvari et al. | 1/1 |
| 7,296,188 B2* | 11/2007 | Paternostro et al. | 714/38 |
| 7,299,382 B2* | 11/2007 | Jorapur | 714/38 |
| 7,363,616 B2* | 4/2008 | Kalyanaraman | 717/124 |
| 7,437,712 B1* | 10/2008 | Brown et al. | 717/122 |
| 7,490,319 B2* | 2/2009 | Blackwell et al. | 717/124 |
| 7,516,438 B1* | 4/2009 | Leonard et al. | 717/102 |
| 7,539,943 B2* | 5/2009 | Vaidyanathan et al. | 715/744 |
| 7,603,653 B2* | 10/2009 | Sundararajan et al. | 717/105 |
| 7,614,042 B1* | 11/2009 | Hardy et al. | 717/124 |
| 7,657,872 B2* | 2/2010 | Kelbaugh et al. | 717/124 |
| 2002/0078071 A1* | 6/2002 | Foster | 707/200 |
| 2003/0018932 A1* | 1/2003 | Blum et al. | 714/46 |
| 2003/0037314 A1* | 2/2003 | Apuzzo et al. | 717/125 |
| 2003/0046681 A1* | 3/2003 | Barturen et al. | 717/177 |
| 2003/0097650 A1* | 5/2003 | Bahrs et al. | 717/124 |
| 2003/0126517 A1* | 7/2003 | Givoni et al. | 714/46 |
| 2003/0229889 A1* | 12/2003 | Kuzmin et al. | 717/130 |
| 2004/0073886 A1* | 4/2004 | Irani | 717/101 |
| 2004/0073890 A1* | 4/2004 | Johnson et al. | 717/124 |
| 2005/0108685 A1* | 5/2005 | Ta | 717/120 |
| 2005/0204201 A1* | 9/2005 | Meenakshisundaram et al. | 714/38 |
| 2005/0223361 A1* | 10/2005 | Belbute | 717/124 |
| 2005/0229159 A1* | 10/2005 | Haba et al. | 717/122 |
| 2006/0041864 A1* | 2/2006 | Holloway et al. | 717/124 |

FOREIGN PATENT DOCUMENTS

JP     5113910 A     5/1993

OTHER PUBLICATIONS

Jung-Min Kim, Adam Porter. *A History-Based Test Prioritization Technique for Regression Testing in Resource Constrained Environments*, ICSE'02, May 19-25, 2002, Orlando, Florida, USA. (C) 2002 ACM 1-58113-472-X/02/0005.

* cited by examiner

SYSTEM AND METHOD FOR MAINTAINING AND TESTING A SOFTWARE APPLICATION

BACKGROUND OF THE INVENTION

1. Technical Field of the Invention

This invention relates to regression testing of programming applications under development. More particularly, it relates to integrating test case generation and change history documentation.

2. Background Art

Regression testing is a manual development process in which a code developer creates test cases upon completion of a code change and executes the test function to determine if the new code functions properly. If the test cases in the regression testing environment pass, the code changes are released in accordance with a development methodology dependent upon the development environment being used but without respect to change history documentation and no automatic verification that the regression test cases were acted upon and deemed production-ready.

There currently does not exist a facility which tightly integrates the application development change management process with a set of automatically created and reusable (for regression test purposes) test cases.

Consequently, there is a need in the art for an improved regression testing and change history environment which tightly integrates the two to ensure a more efficient and verifiable approach to code development production release.

SUMMARY OF THE INVENTION

A system, method and computer program product for maintaining and testing a software application by performing regression testing using standard reusable test cases from change history records to generate actual test cases; creating a new test case template upon saving a change history entry; flagging a subset of the actual and new test cases; generating and documenting new actual test cases from the subset; and releasing the new actual test cases after successful verification.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

Figure 1:
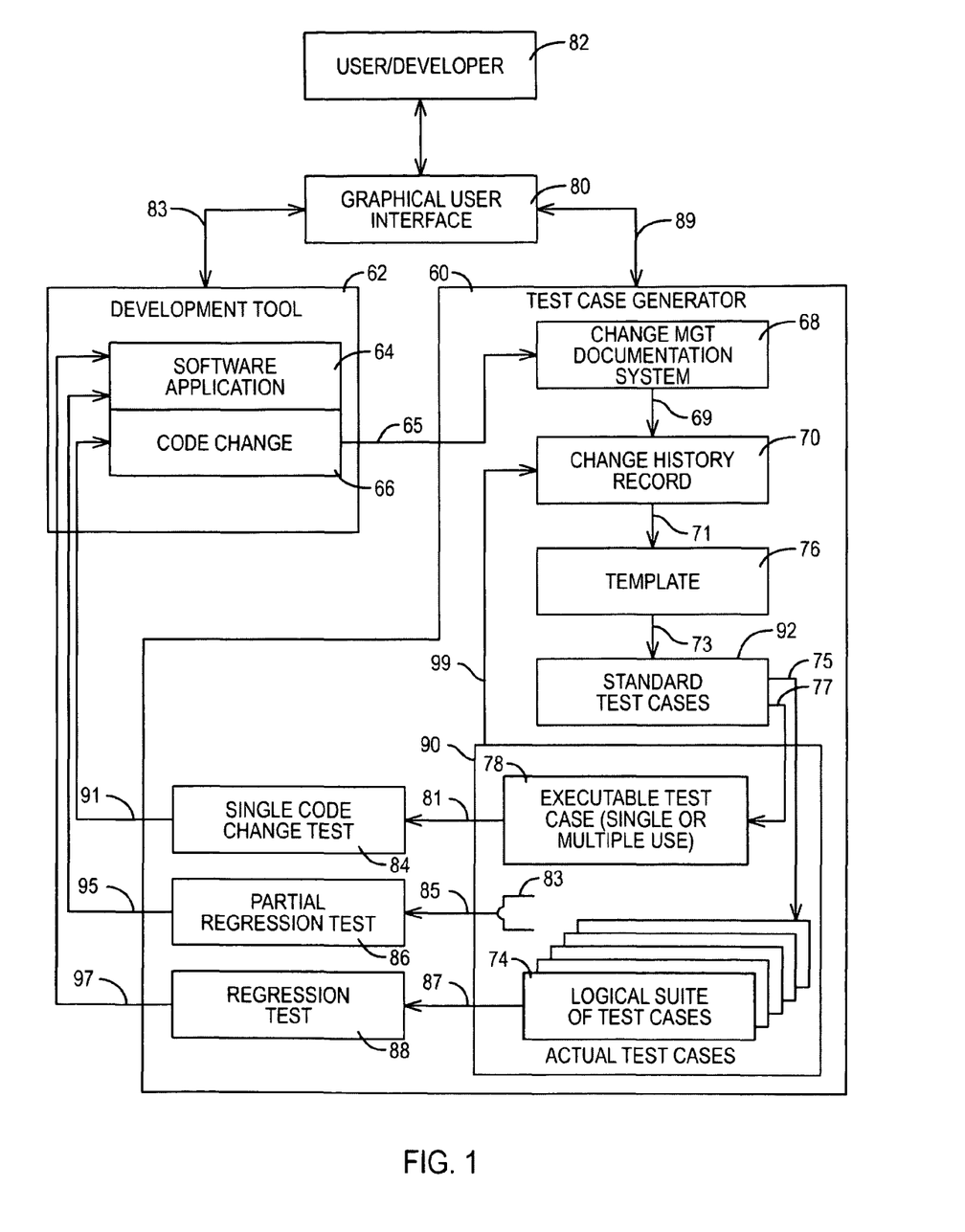
FIG. 1 is a diagrammatic representation of the test case generator system of the preferred embodiment of the invention.

Referring to FIG. 1, in accordance with the present invention, there is provide a system, method, and computer program product for maintaining and testing software applications 64 in which a test case generator system 60 generates reusable test cases 90 for any type of software application system 64.

Generator system 60 includes a change management documentation system 68 that creates test cases 90 that are standardized to a template 76 and resulting standardized test cases 74 reused for future regression testing 88 of an entire application 64. Standardized test case templates 76 based on the change management documentation system 68 are automatically created, and these templates 76 are used to generate test cases 92 used by a software application programmer in testing the application.

Change management documentation system 68 tracks, as is represented by line 65, changes 66 to the software application 64 to generate the standard reusable test cases 92 independent of type of software application 64, and these test cases 92 are used in generating actual test cases 74 for regression testing 88 of an application system 64.

Graphical user interface (GUI) layer 80 runs, as is represented by lines 81 and 89, in conjunction with development tool 62 and test case generator 60. Development tool 62 recognizes code changes 66 and by way of GUI 80 prompts the user/developer and guides the regression test/test case/change history documentation to verify production-ready changes 66.

In accordance with a preferred embodiment, there is provided a mechanism for automatically generating reusable test cases 90 when a problem or new requirement is identified in the change management system 68. These test cases 90 are initially templates 76 which are used, as represented by line 73, to create standard test cases 92 from which are selected, as is represented by line 77, single executable test cases 78 for single code change test 84 or, as is represented by line 75, a logical suite 74 of test cases for regression testing 86, 88 purposes.

Upon saving, as is represented by line 69, a change history entry 70, a new test case may be created, as is represented by line 71, to form a test case template 76. These templates 76 may be used, as is represented by line 73, to create standard test cases 92 from which either reusable or single (one-time) use test cases 78 may be selected, as is represented by lines 75 and 77, depending on the nature of the code change 66 to the application 64 under test. These may be used, as is represented by lines 81 and 91, in code test 84, or in regression tests 88, 86.

In regression testing 88, as is represented by lines 87 and 97, a standard set of reusable test cases 92 derived from change history records 70, as is represented by lines 71, 73 and 75, is used to generate a suite 74 of actual test cases 90 that are documented during regression testing 88.

In partial regression testing 86, as is represented by lines 85 and 95, any section or functional area (i.e., group of forms within one database, one application within a larger tool suite, etc.) is specified and flagged as a subset 83 of the reusable test cases 74 that can be regenerated and tested against.

Reusing standardized test cases 92 involves flagging a set of test case templates 76 and having an agent generate copies as actual test cases 90 to be used for testing and documentation.

Automatic notification of testing due dates is provided. If a due date for completion of testing is documented, an agent notifies the developer 82 (aka user) owning that particular test case 90 when testing 84, 86, or 88 is due.

Tested changes 66 only are released. If a test case 90 has been used for a particular change, verification of testing "passed" must occur before the change 66 is allowed to be "released".

To close the loop from change 66 to test 84, 86, 88 to production (that is, release of application 64), if testing fails due to a new problem or change 66 that needs to be corrected, as is represented by line 99, a new change history record 70 may be created directly from the test case 90.

New actual test cases 74 may be released when a full regression test 88 of the environment 64, 66 is not deemed necessary, and testing 84 of individual test cases 78 for small code changes 66 will suffice. A pass/fail determination is made after the developer 82 tests an actual test case 90, created from the change history record 70.

Change management documentation system 68 creates, as is represented by line 71, a test case template 76 upon saving, as is represented by line 69, a change history entry 70. To do so, developer 82 is prompted via GUI 80 to create a test case template 76 for regression testing 88 purposes to be used at a later date. If the user responds to the prompt positively, the information in the change history document 70 is used to create the test case template 76.

Figure 3:
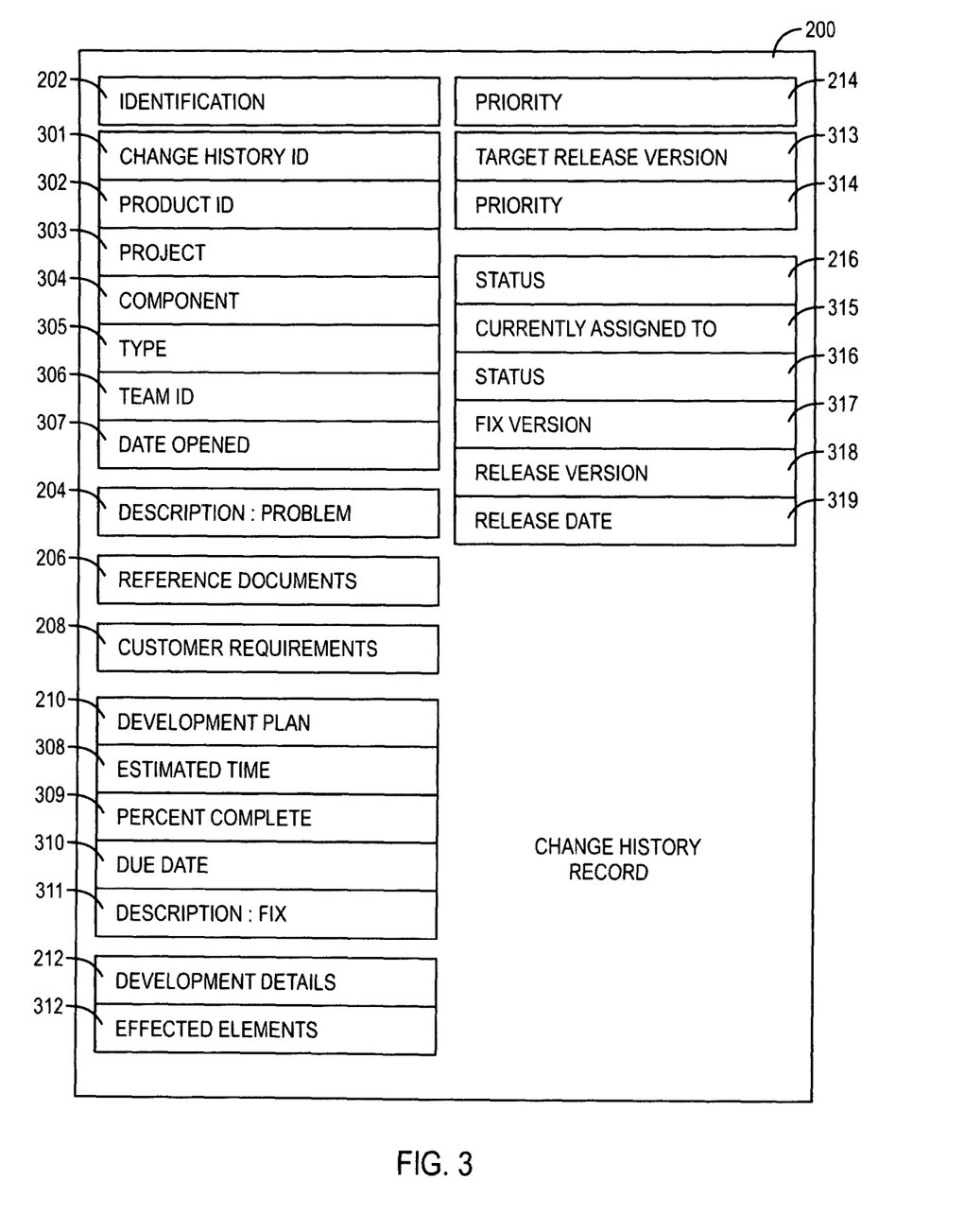
FIG. 3 is a diagrammatic representation of a change history record in accordance with an exemplary embodiment of the invention.
Figure 4:
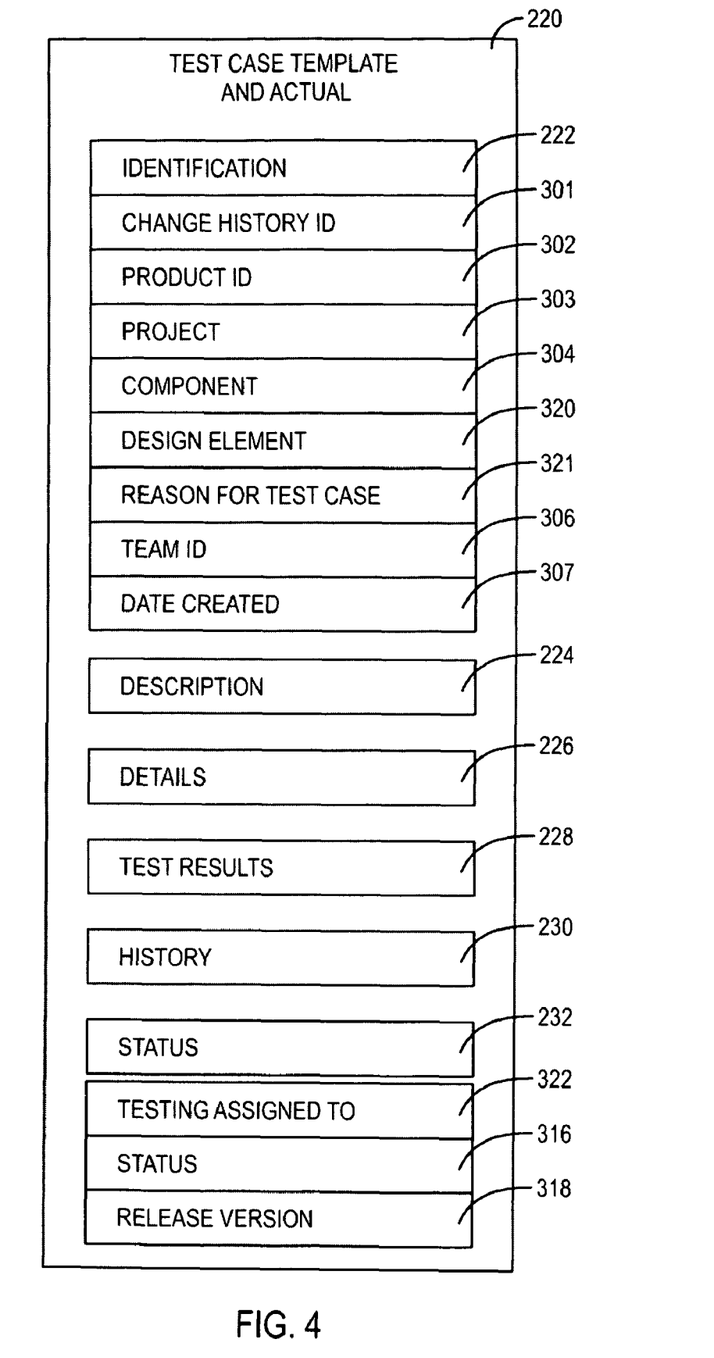
FIG. 4 is a diagrammatic representation of a test case template and actual test case in accordance with an exemplary embodiment of the invention.

FIGS. 3 and 4 illustrate, as they appear at GUI 80, change history record 70 and test case template 76/actual test case 90, respectively. Test cases 90 are similar in nature to change history record 70, and also include results of testing.

Figure 2:
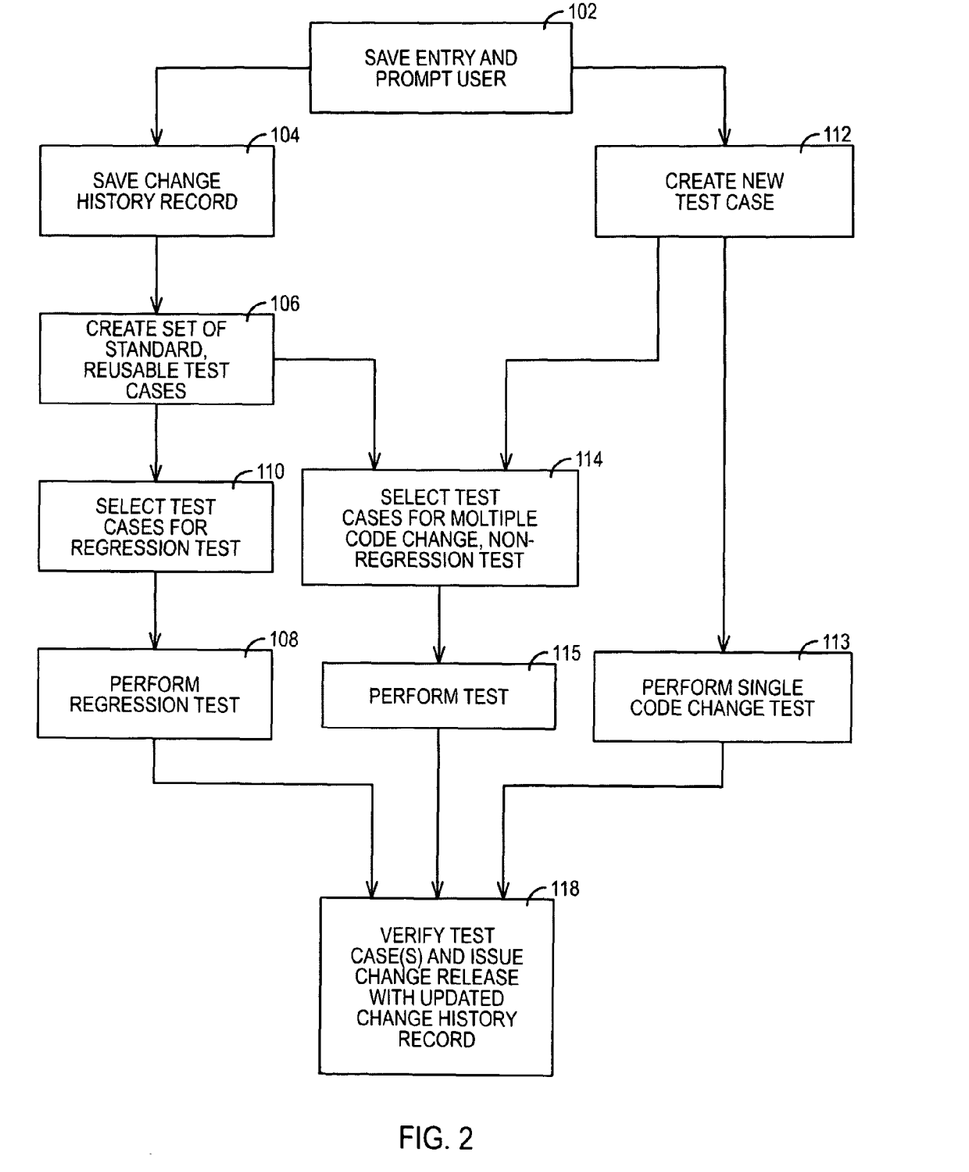
FIG. 2 is a diagrammatic representation of the process of the preferred embodiment of the invention for generating regression test cases.

Referring to FIG. 2 in connection with FIG. 1, the process of the invention executes as an application 60 on top of a development tool 62, be it Websphere, Lotus Notes, or equivalent.

The input to test case generator system 60 is actual code, or code changes 66.

Reusable test case generator 60 takes actual code changes 66 performed in a development environment 62 and automates the creation of the change history records 70, standard test cases 92, and reusable test cases 74 to perform more advanced regression testing on software application 64 when some number of significant code changes 66 has been reached.

In step 102 a save is performed preparatory to creating a test case 78 and/or change history record 70 from actual code 64 or code change 66. In this step 102, template 76 is created. Upon the save, GUI interface 80 prompts the developer to save a change history record 70 for creating a template 76, or to create a one-time test case 78 directly.

In step 104 development code changes 66 saved from step 102 are saved as change history records 70 documenting the change.

In step 106 a set of standard reusable test cases 92 is created from the output of step 104. The input to step 106 is change management records 70 that are to be utilized for regression test 88 of the application 64 being developed. In step 106 test cases 74 are saved to fill a set of reusable test cases 92 for subsequent use in performing a full 88 or partial 86 regression test on application 64. The output of step 106 is a set of standard reusable test cases 92.

In step 110 actual test cases 74 are selected out of the collection of standard test cases 92 for subsequent regression test.

In step 108, regression test 88 using test cases 74, or partial regression test using subset 83 of test cases 74, is conducted on application 64. These test cases 74 are used to document the pass/fail results of regression testing 88.

In step 112, a new test case 78 is created and saved from step 102. The input to step 112 is saved code change 66 in the development tool 62 and the output is an actual test case 78 for single code-change testing.

In step 113, the new test case 78 created in step 112 is used in test 84 against code change 66.

In step 114 a subset of new actual test cases 78 from steps 106 and 112 are selected and flagged to create a set of test cases to be used for testing in step 115, a non-regression test of multiple code changes 66.

Thus, a pass/fail decision can happen at step 113 for single code-change testing, or at step 115 for multiple code-change, non-regression testing.

In step 118 a change release record 70, with version and release number and updated documentation of the change history record, is generated from test cases 90 passed in steps 108, 115, and 113.

Table 1 summarizes operations of the steps of the preferred embodiment of the invention.

TABLE 1

| \multicolumn{4}{c}{PROCESS SUMMARY} |
|---|---|---|---|
| Step | Input | Output | Operation |
| 102 | actual code development or code change 66 | change history record 70 and/or an actual test case 78 | perform save and prompt user to create a test case 78 and/or change history record 71 |
| 104 | saved development code or code change 66 | change history record 70 for documentation of the change | save the change history record 70 |
| 106 | change history records 70 to utilize for regression test | set of standard reusable test cases 92 | save test cases 92 to fill a set of reusable test case scenarios 74 for performing a full 88 or partial 86 regression test |
| 110 | output of step 106: actual, standard and reusable test cases | test cases 74 to be used for regression testing | create (by selection out of the master list of standard test case 92) actual test cases 74 used to document pass/fail during regression testing 86, 88 |
| 108 | output of step 110: actual test cases 74 created from standard reusable test cases 92 when regression test 86, 88 occurs | pass/fail result of regression testing 86, 88, case by case | perform regression test 86, 88 |
| 112 | from step 102: saved code change 66 in the development tool 62 | actual test case 78 for single code change test 84 | create and save test case 78 |
| 113 | from step 112: test case 78 | pass/fail result of single code change test 84 | perform single code change pass/fail test 84 |
| 114 | from steps 106 and 112: actual test case set 78 | set of test cases 78 to be used for non-regression testing 84 of | select test cases for performing pass/fail test for multiple code change, non- |

TABLE 1-continued

PROCESS SUMMARY

| Step | Input | Output | Operation |
|------|-------|--------|-----------|
| 115 | from step 114: test cases 78 | multiple code changes pass/fail result | regression test perform non-regression test 84 of multiple code changes |
| 118 | from steps 108, 115, 113: passed test cases 90 | change release and updated documentation of the change history record 70 to reflect release date, etc. | verify test cases from step 108, 115, and 113, and issue change release (with version and release number) of new actual test cases 90 successfully verified |

Referring to FIG. 3, a GUI 80 representation of a change history record 200 illustrates an exemplary embodiment of change history record 70.

Problem record 200 includes identification 202, problem description 204, reference documents 206, customer requirements 208, development plan 210, development details 212, priority 214, and status 216 fields. Identification field 202 includes, for example, fields defining change history identifier 301, product identifier 302, project identifier 303, component identifier 304, type 305, team identifier 306, and open date 307. Development plan field 210 includes fields representing estimated time 308, percent complete 309, due date 310, and fix description 311. Development details field 212 contains fields describing effected elements 312. Priority field 214 contains fields identifying target release version 313 and priority 314. Status field 216 includes fields identifying person 315 currently assigned to the problem, status 316, fix version 317, and product release version 318 and release date 319.

Referring to FIG. 4, a GUI 80 representation of a change history production test case 220 illustrates an exemplary test case 92. Fields for a template 76 are similar, and also similar for actual test cases 90, with actual test case 90 also including documentation from the testing 84, 86, 88.

Change history 220 includes identification 222, description 224, details 226, test results 228, history 230, and status 232 fields. Identification field 222 includes, for example, fields defining change history identifier 301, product identifier 302, project 303, component 304, design element 320, reason for test case 321, team identifier 306, and date created 307. Status field 232 includes, for example, fields identifying person 322 to whom testing is assigned, status 316, and release version 318.

A test case 90, 92 is an environment, or set of variable effected by code. In this exemplary embodiment, these variables may be entered by user 82 in components field 304. During test, these components 304 may be run during tests 108, 113, 115 against application code 64 or code change 66, and the results recorded, for example, to field 228.

Advantages Over the Prior Art

It is an advantage of the invention that there is provided a method and system for documenting code change production releases for auditability and reliability, verifying accuracy of tested products, and more efficiently utilizing developer time spent in testing code releases.

Alternative Embodiments

The invention can take the form of an entirely hardware embodiment, an entirely software embodiment or an embodiment containing both hardware and software elements. In a preferred embodiment, the invention is implemented in software, which includes but is not limited to firmware, resident software, and microcode.

Figure 5:
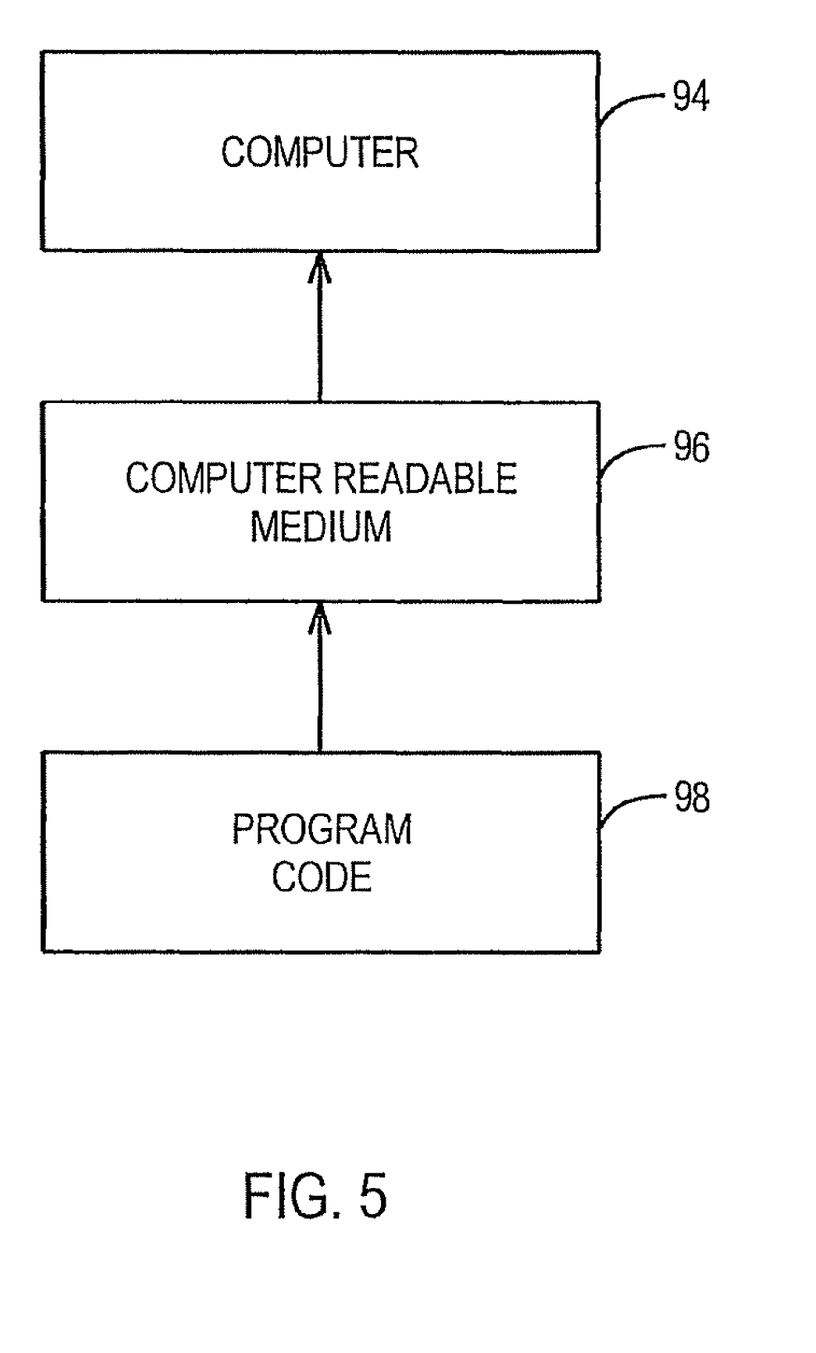
FIG. 5 is a diagrammatic representation of a system including a computer program product accessible from a computer-usable or computer-readable medium providing program code for use by or in connection with a computer or any instruction execution system.

Referring to FIG. 5, the invention can take the form of a computer program product accessible from a physically tangible computer-readable storage medium 96 providing program code 98 for use by or in connection with a computer 94 or any instruction execution system. For the purposes of this description, the computer-readable medium 96 can be any apparatus that can store the program for use by or in connection with the instruction execution, system, apparatus, or device.

The medium 96 can be an electronic, magnetic, optical, electromagnetic, infrared, or semiconductor system (or apparatus or device) or a storage medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer, or data processing, system 94 suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

We claim:

1. A method for maintaining and testing a software application, said method comprising:

generating a new test case template pertaining to a code change that was made to the software application;

after said generating the new test case template, creating standard test cases through use of the new test case template, wherein each standard test case pertains to the code change, and wherein the standard test cases includes a new test case;

selecting at least one test case from the standard test cases, wherein the at least one test case includes the new test case; and a processor of a computer system testing the software application by using the at least one test case that was selected, wherein the method further comprises:

after said generating the new test case template and before said creating the plurality of standard test cases, saving a change history record documenting the code change;

recording variables impacted by the code change in a components field of the new test case template;

recording results of said testing the software application in a test results field of an actual test case template;

verifying that said testing the software application was successful;

after said verifying, generating a code change release record that identifies a version and release number of the software application having the code change; and recording in the change history record a release date pertaining to the code change.

2. The method of claim 1, wherein said selecting at least one test case comprises selecting multiple test cases from the standard test cases, and wherein said testing comprises regression testing the computer application by using the multiple test cases that were selected.

3. The method of claim 1, wherein said selecting at least one test case comprises selecting multiple test cases from the standard test cases, wherein said testing comprises regression testing the computer application by using a subset of the multiple test cases that were selected, and wherein the subset of the multiple test cases comprises fewer than all of the multiple test cases.

4. The method of claim 1, wherein said selecting at least one test case consists of selecting the new test case from the standard test cases, and wherein said testing comprises testing the computer application by using only the new test case that was selected.

5. The method of claim 1, wherein said selecting at least one test case comprises selecting multiple test cases from the standard test cases, and wherein said testing comprises non-regression testing the computer application by using the multiple test cases that were selected.

6. The method of claim 1, wherein the method further comprises:

generating in a graphical user interface (GUI) a display of the change history record, wherein the displayed change history record comprises text describing identification details, the code change and an associated code problem, reference documents, customer requirements, a development plan, development details, priority data, and status data; and responsive to receiving an indication to generate the new case template, performing said generating the new test case template, said indication having been received from a user to whom the GUI had been displayed, wherein the identification details include a change history identifier, a product identifier, a project identifier, a component identifier, a type, a team identifier, and an open date, wherein the development plan includes an estimated time, percent complete, due date, and fix description, wherein the development details include effected elements, wherein the priority data includes a target release version and a priority, and wherein the status data includes an identification of a person currently assigned to the code problem, a status, a fix version, a release version, and a release date.

7. The method of claim 1, wherein the method further comprises:

generating in a graphical user interface (GUI) a display of the new case template, wherein the displayed new case template comprises text describing identification details, a description of the code change, test results, history, and status data, wherein the identification details include change a history identifier, a product identifier, a project, a component, a design element, a reason for the new test case, a team identifier, and a date created, and wherein the status data includes an identification of a person currently assigned to a code problem to which the code change is associated, a status, and a release version.

8. A computer program product, comprising a physically tangible computer readable storage medium having a computer readable program code stored therein, said computer readable program code configured to be executed by a processor of a computer system to implement a method for maintaining and testing a software application, said method comprising:

generating a new test case template pertaining to a code change that was made to the software application;

after said generating the new test case template, creating standard test cases through use of the new test case template, wherein each standard test case pertains to the code change, and wherein the standard test cases includes a new test case;

selecting at least one test case from the standard test cases, wherein the at least one test case includes the new test case; and testing the software application by using the at least one test case that was selected, wherein the method further comprises:

after said generating the new test case template and before said creating the plurality of standard test cases, saving a change history record documenting the code change;

recording variables impacted by the code change in a components field of the new test case template;

recording results of said testing the software application in a test results field of an actual test case template;

verifying that said testing the software application was successful;

after said verifying, generating a code change release record that identifies a version and release number of the software application having the code change; and recording in the change history record a release date pertaining to the code change.

9. The computer program product of claim 8, wherein said selecting at least one test case comprises selecting multiple test cases from the standard test cases, and wherein said testing comprises regression testing the computer application by using the multiple test cases that were selected.

10. The computer program product of claim 8, wherein said selecting at least one test case comprises selecting multiple test cases from the standard test cases, wherein said testing comprises regression testing the computer application by using a subset of the multiple test cases that were selected, and wherein the subset of the multiple test cases comprises fewer than all of the multiple test cases.

11. The computer program product of claim 8, wherein said selecting at least one test case consists of selecting the new test case from the standard test cases, and wherein said testing comprises testing the computer application by using only the new test case that was selected.

12. The computer program product of claim 8, wherein said selecting at least one test case comprises selecting multiple test cases from the standard test cases, and wherein said testing comprises non-regression testing the computer application by using the multiple test cases that were selected.

13. The computer program product of claim 8, wherein the method further comprises:

generating in a graphical user interface (GUI) a display of the change history record, wherein the displayed change history record comprises text describing identification details, the code change and an associated code problem, reference documents, customer requirements, a development plan, development details, priority data, and status data; and responsive to receiving an indication to generate the new case template, performing said generating the new test case template, said indication having been received from a user to whom the GUI had been displayed, wherein the identification details include a change history identifier, a product identifier, a project identifier, a component identifier, a type, a team identifier, and an open date, wherein the development plan includes an estimated time, percent complete, due date, and fix description, wherein the development details include effected elements, wherein the priority data includes a target release version and a priority, and wherein the status data includes an identification of a person currently assigned to the code problem, a status, a fix version, a release version, and a release date.

14. The computer program product of claim 8, wherein the method further comprises:

generating in a graphical user interface (GUI) a display of the new case template, wherein the displayed new case template comprises text describing identification details, a description of the code change, test results, history, and status data, wherein the identification details include change a history identifier, a product identifier, a project, a component, a design element, a reason for the new test case, a team identifier, and a date created, and wherein the status data includes an identification of a person currently assigned to a code problem to which the code change is associated, a status, and a release version.

15. A computer system comprising a processor and a computer readable memory unit coupled to the processor, said memory unit containing program code configured to be executed by the processor to implement a method for maintaining and testing a software application, said method comprising:

generating a new test case template pertaining to a code change that was made to the software application;

after said generating the new test case template, creating standard test cases through use of the new test case template, wherein each standard test case pertains to the code change, and wherein the standard test cases includes a new test case;

selecting at least one test case from the standard test cases, wherein the at least one test case includes the new test case; and testing the software application by using the at least one test case that was selected, wherein the method further comprises:

after said generating the new test case template and before said creating the plurality of standard test cases, saving a change history record documenting the code change;

recording variables impacted by the code change in a components field of the new test case template;

recording results of said testing the software application in a test results field of an actual test case template;

verifying that said testing the software application was successful;

after said verifying, generating a code change release record that identifies a version and release number of the software application having the code change; and recording in the change history record a release date pertaining to the code change.

16. The computer system of claim 15, wherein said selecting at least one test case comprises selecting multiple test cases from the standard test cases, and wherein said testing comprises regression testing the computer application by using the multiple test cases that were selected.

17. The computer system of claim 15, wherein said selecting at least one test case comprises selecting multiple test cases from the standard test cases, wherein said testing comprises regression testing the computer application by using a subset of the multiple test cases that were selected, and wherein the subset of the multiple test cases comprises fewer than all of the multiple test cases.

18. The computer system of claim 15, wherein said selecting at least one test case consists of selecting the new test case from the standard test cases, and wherein said testing comprises testing the computer application by using only the new test case that was selected.

19. The computer system of claim 15, wherein said selecting at least one test case comprises selecting multiple test cases from the standard test cases, and wherein said testing comprises non-regression testing the computer application by using the multiple test cases that were selected.

20. The computer system of claim 15, wherein the method further comprises:

generating in a graphical user interface (GUI) a display of the change history record, wherein the displayed change history record comprises text describing identification details, the code change and an associated code problem, reference documents, customer requirements, a development plan, development details, priority data, and status data; and responsive to receiving an indication to generate the new case template, performing said generating the new test case template, said indication having been received from a user to whom the GUI had been displayed, wherein the identification details include a change history identifier, a product identifier, a project identifier, a component identifier, a type, a team identifier, and an open date, wherein the development plan includes an estimated time, percent complete, due date, and fix description, wherein the development details include effected elements, wherein the priority data includes a target release version and a priority, and wherein the status data includes an identification of a person currently assigned to the code problem, a status, a fix version, a release version, and a release date.

21. The computer system of claim 15, wherein the method further comprises:

generating in a graphical user interface (GUI) a display of the new case template, wherein the displayed new case template comprises text describing identification details, a description of the code change, test results, history, and status data, wherein the identification details include change a history identifier, a product identifier, a project, a component, a design element, a reason for the new test case, a team identifier, and a date created, and wherein the status data includes an identification of a person currently assigned to a code problem to which the code change is associated, a status, and a release version.

* * * * *